No. 616,933. Patented Jan. 3, 1899.
J. J. KENNELLY.
BRAKE APPARATUS.
(Application filed Nov. 4, 1897.)
(No Model.) 2 Sheets—Sheet 1.
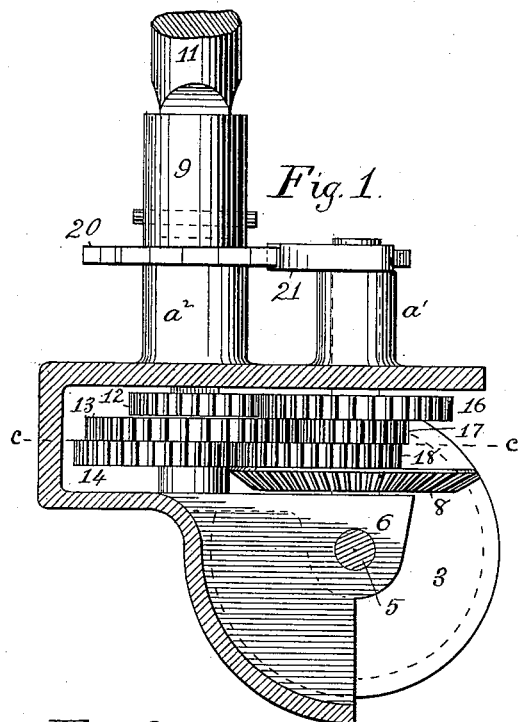
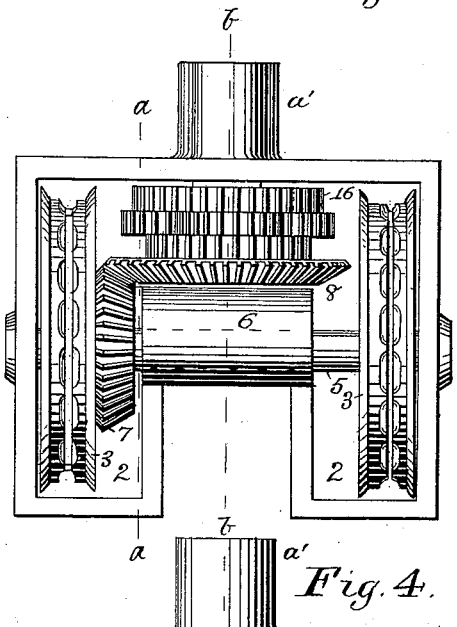
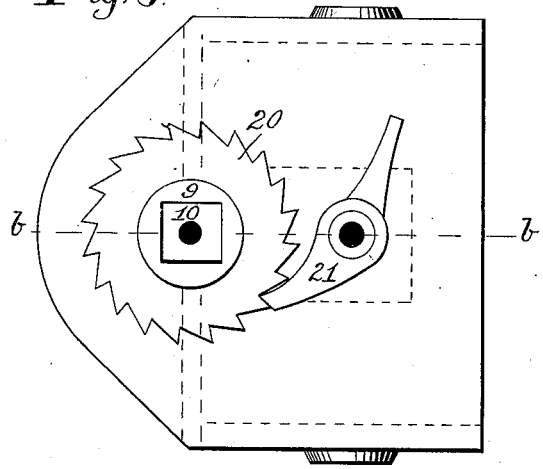
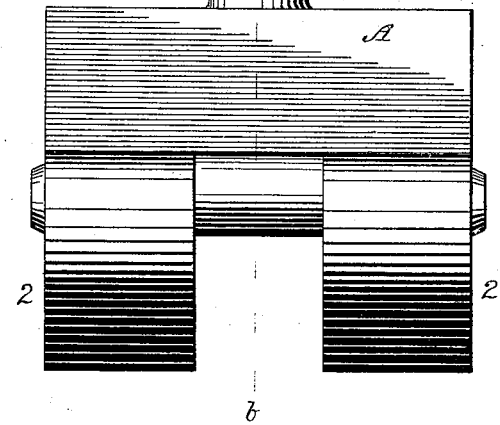
WITNESSES
J. S. Fair
J. J. Kennelly
INVENTOR;
By
D. B. Gallatin,
Attorney.
THE NORRIS PETERS CO., PHOTO-LITHO., WASHINGTON, D. C.

No. 616,933. Patented Jan. 3, 1899.
J. J. KENNELLY.
BRAKE APPARATUS.
(Application filed Nov. 4, 1897.)
(No Model.) 2 Sheets—Sheet 2.
Fig. 6.  Fig. 6.ª  Fig. 5.
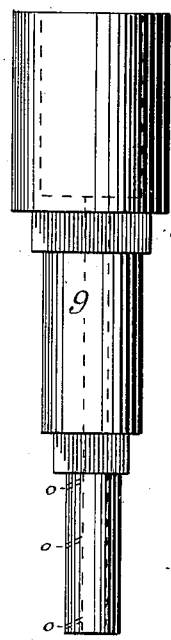
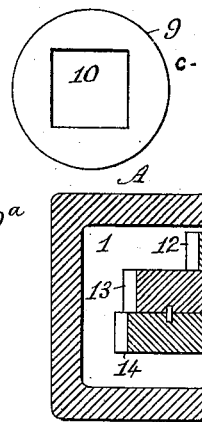
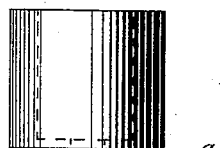
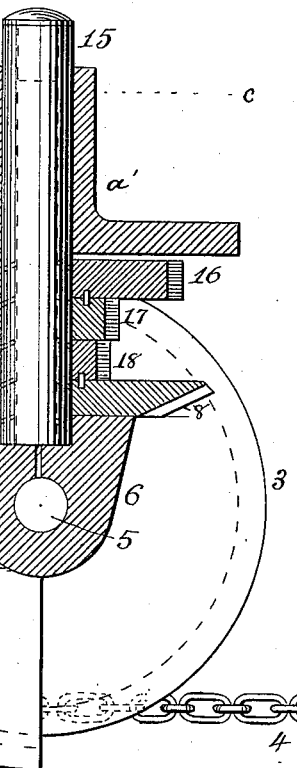
Fig. 8.
Fig. 7.
WITNESSES
J. S. Fair
C. M. Irlan
J. J. Kennelly,
INVENTOR:
By
D. B. Gallatin,
Attorney.
THE NORRIS PETERS CO., PHOTO-LITHO., WASHINGTON, D. C.

UNITED STATES PATENT OFFICE.

JOHN J. KENNELLY, OF NEW YORK, N. Y.

BRAKE APPARATUS.

SPECIFICATION forming part of Letters Patent No. 616,933, dated January 3, 1899.

Application filed November 4, 1897. Serial No. 657,446. (No model.)

*To all whom it may concern:*

Be it known that I, JOHN J. KENNELLY, a citizen of the United States, residing at New York, in the county of New York and State of New York, have invented certain new and useful Improvements in Brake Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has special reference to mechanism for operating and applying the brakes of railway-cars, and more particularly to apparatus adapted for use on street-cars.

It has for its object to apply the brake quickly and with great power and to obtain the greatest effect with the least movement of the brake rod or handle.

In the accompanying drawings, Figure 1 represents a vertical section on the line $a\ a$ in Fig. 2; Fig. 2, a front elevation; Fig. 3, a plan view; Fig. 4, a rear elevation; Fig. 5, an enlarged vertical section on the line $b\ b$ in Figs. 2, 3, and 4; Fig. 6, a side elevation, and Fig. 6$^a$ a top view, of the socketed pintle to which the brake-rod is applied and through which the apparatus is operated; Fig. 7, a partial section on the line $c\ c$ in Fig. 5, showing the arrangement of eccentric gearing; and Fig. 8, a longitudinal section through the small shaft or pintle on which a part of the operating-gears are mounted.

Referring to the drawings, A designates a case or housing open at the front and formed with a horizontal chamber 1 in the upper part thereof for the reception of a system of driving-gear and with vertical chambers 2 2 for the reception of sprocket wheels or drums 3 3, on which are wound chains 4, that connect with the break-beam, (not shown,) as usual in apparatus of this character. The drums 3 3 are fixed on a horizontal shaft 5, the ends of which have bearings in the side walls of the case A and the central part of which is sustained in a bearing 6, formed between the two chambers 2 2. The said shaft has also fixed on it a bevel-gear 7, which meshes with and is driven by another bevel-gear 8, located in the bottom of the chamber 1.

The gear 8 is operated as follows: Extending vertically through the case toward the rear thereof is a shaft 9, having in its enlarged upper end a socket 10 for the reception of the end of the brake-rod 11, whereby it is adapted to be turned. On this shaft are three gears 12 13 14 of different sizes. The gear 12 is fast on the shaft and rotates therewith; but the gears 13 and 14 are loose thereon and capable of rotating independently. In front of the shaft 9 is a short shaft or pintle 15, which forms an axis for three spur-gears 16, 17, and 18 and for the bevel-gear 8, these being all loose thereon. The gears 12 13 14 mesh with 16, 17, and 18, respectively, and gear 12 being fast on its shaft 9 it drives gear 16 when the shaft is rotated by power applied to the brake-rod 11. Gears 16 and 17 are rigidly connected and rotate together, both being thus driven by the gear 12, and gear 17 being in mesh with 13 the latter is driven thereby. Gears 13 and 14 are also rigidly connected and rotate together, so that 14 becomes the driving-gear for 18, which latter is connected with and carries with it the bevel-gear 8. It will thus be understood that power applied to the brake rod or handle is transmitted back and forth from one series of gears to the other, 12 being the driver for 16 and 17, 17 for 13 and 14, and 14 for 18 and 8, and that the latter drives the drums 3 through the intermediate bevel-gear 7.

As before stated and as shown in the drawings, the gears are of different sizes. The preferred proportions may be stated as follows: gear 12, two-thirds the diameter of 16, so that one and one-half turns of shaft 9 will turn gear 16 through one complete rotation; gear 17, one-half the diameter of 13, so that two rotations of 16 and 17 (which are connected together) or three rotations of shaft 9 and gear 12 are required to impart one complete rotation to 13. Gears 14 and 18 are both eccentric, as best shown in Fig. 7, and while differing in size from the other gears of the series these are of the same size, and they are so arranged that the greater radius of one is opposed to the lesser radius of the other, as clearly shown in Fig. 7, from which it results that a uniform movement of the driving-gear imparts a variable or varying movement to the driven gear, the rate of movement increasing as the greater radius of the driving-gear 14 approaches the working point and diminishing as the lesser radius approaches the same point.

In practice it is intended that the gears 14 and 18 shall be so arranged and the length of the chains 4 so adjusted that the brake or brakes shall be fully applied when the parts are in the position shown in Figs. 1, 5, and 7 and fully released when the relative positions of the gears 14 and 18 are reversed—that is, when they have turned backward through one hundred and eighty degrees. If then the gears 14 and 18 stand when the brake is off in relative positions with the greater radius of 14 opposed to the lesser radius of 18, it is clear that at the beginning of the operation of setting up the brake-gear 18 (and bevel-gear 8 connected therewith) will move at relatively high speed, the effect of which is a quick movement of the brake toward or to its operative position with relatively slight movement of the brake-handle, and that until the brake-shoe strikes the wheel there is practically no resistance and consequently no occasion for strong leverage. After the brake-shoe comes in contact with the wheel slight movement is required to bring it into full and effective action, and by the time such position is reached the relative positions of gears 14 and 18 will have changed so that the short radius of 14 will be opposed to the longer radius of 18, as shown in the drawings, giving powerful leverage for the final slight movement necessary to bring the brake into full action.

I have stated that the preferred proportions of the operating-gears are such that three rotations of the brake rod or handle give one rotation to gear 13; also, that the length of chains 4 is to be such that a half-turn of the eccentric gears 14 and 18 will carry the brake into full and effective operation from the fully-relaxed and inoperative position, from which it will be understood that one and one-half turns of the brake-rod will suffice to apply the brake from the relaxed position. It should be stated in addition that I propose to make the sprocket or chain drums sixteen inches in circumference and bevel-gear 8 one and one-half times the diameter of the intermeshing gear 7. Then the half-turn of gear 8 will impart a three-fourths turn to gear 7 and to the chain-drums, whereby twelve inches of chain will be taken up or unwound by one and one-half turns of the brake-handle. These I regard as desirable and proper proportions; but should it be found in practice that less length of chain will suffice the proportions of the bevel-gears 7 and 8 may be varied.

The apparatus thus described is to be fixed on the under side of the platform of the car and supplied with the usual pawl and ratchet to hold the brake in operation.

The case A has on its upper side hollow bosses $a'$ $a^2$, which extend through the floor of the platform (indicated by broken lines in Fig. 5) and form extended bearings for the shafts or pintles 9 and 15. They also form supports, respectively, for the ratchet-wheel 20 and for the pawl 21.

The ratchet-wheel is formed with a square or angular opening, which fits a correspondingly-shaped section $9^a$ of the shaft 9, no special fastening being thus required to hold it in place.

The pawl 21 is formed with a round eye which fits upon the projecting end of the pintle 15 and turns loosely thereon.

For convenience in oiling the several bearings the shafts or pintles 9 and 15 are each bored centrally, as shown in Figs. 7 and 8, to form oil-cups therein. These cups so formed have lateral ducts or passages $o$ leading therefrom to supply oil at desired points. The brake-rod 11 closes the top of the oil cup or chamber in the shaft 9 to prevent the entrance of dirt, while the chamber in the pintle 15 is closed by a plug $15^a$.

From the foregoing description it is to be understood that the apparatus embodying my invention comprehends in reality three sets or systems of gearing, as follows: first, a speed-multiplying gearing consisting of the two bevel-gears 7 and 8 for quickly bringing the brake into action; second, a power-multiplying gearing consisting of the gears 12, 13, 16, and 17, and, third, a combined speed and power multiplying gearing consisting of the two eccentric gears 14 and 18, which assist first in bringing the brake quickly into action and then by a change of leverage assist the power-multiplying gearing in an effective application of the brake.

Having now described my invention, I claim—

1. A brake apparatus comprehending a winding drum or wheel, two eccentric gears working together with the longer radius of one opposed to the shorter radius of the other, and intermediate gearing between one of said gears and the winding-drum for driving the latter.

2. In a brake apparatus the combination of a winding drum or wheel, a system of power-multiplying gearing, and a system of speed-multiplying gearing, all working together substantially in the manner shown and described.

3. In a brake apparatus, the combination of a system of power-multiplying gearing, and a system of speed-multiplying gearing, and intermediate devices embodying eccentric gears, as set forth.

4. In a brake apparatus, the combination with a winding drum or wheel and two parallel shafts at right angles to the drum-shaft, of power-multiplying gearing and speed-multiplying gearing on the said parallel shafts, and two eccentric gears meshing with each other, as set forth.

5. In a brake apparatus, the combination of a winding drum or wheel, a shaft, a gear fast thereon, an eccentric gear and intermediate gear loose on said shaft and connected to move together, a second shaft and two sets of gears loose thereon and the gears of each set connected together, one of said gears being eccentric and meshing with the first-mentioned eccentric gear, with the longer radius of the one opposed to the shorter radius of the other, substantially as specified.

In testimony whereof I affix my signature in presence of two witnesses.

JOHN J. KENNELLY.

Witnesses:
JUSTUS HOUK,
JOHN J. DEERING.